Figure 4:
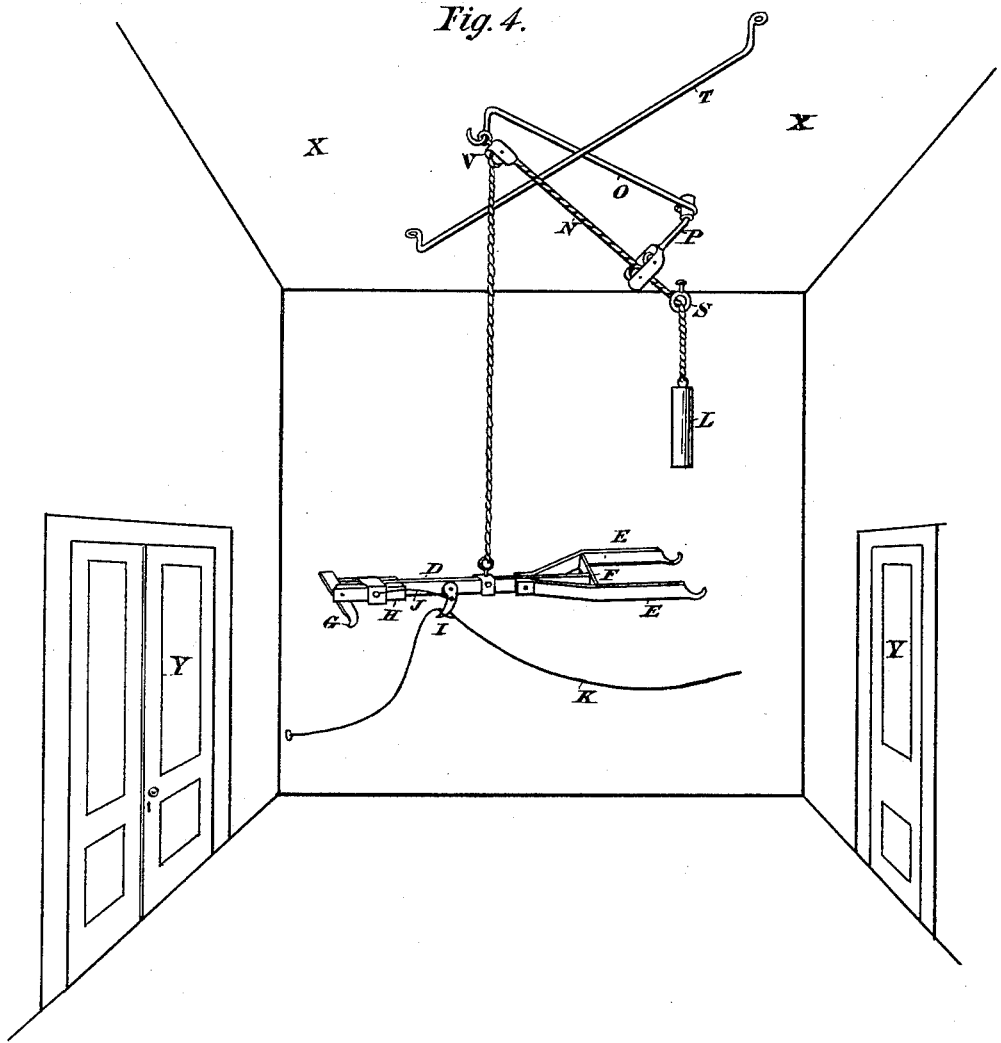

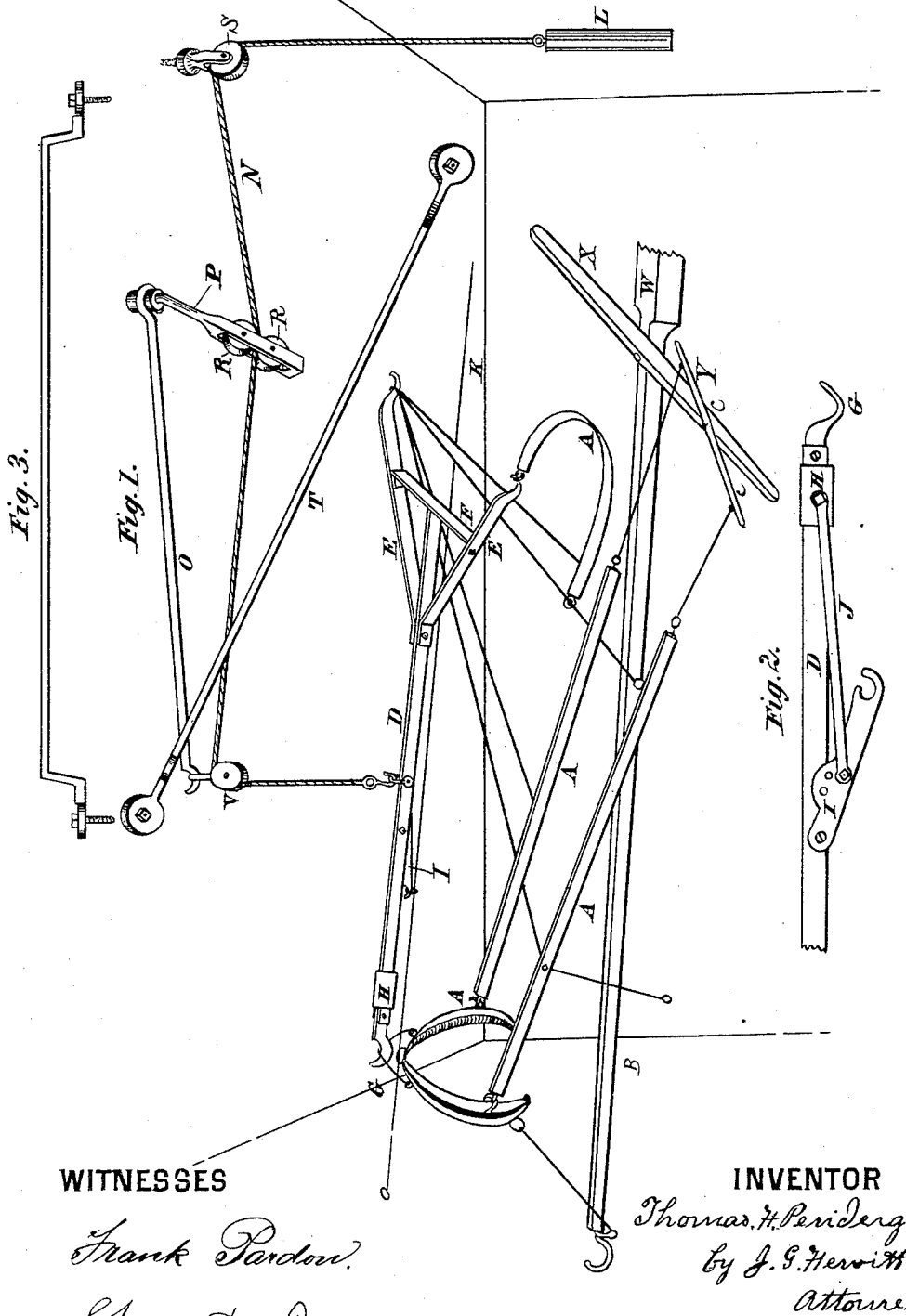

(No Model.) 2 Sheets—Sheet 2.

T. H. PENDERGAST.
DEVICE FOR HANGING HARNESS.

No. 327,585. Patented Oct. 6, 1885.

WITNESSES.
Frank Pardon.
George Hammor.

INVENTOR.
Thomas H. Pendergast
by J. G. Hewitt
Attorney

UNITED STATES PATENT OFFICE.

THOMAS H. PENDERGAST, OF LOUISVILLE, KENTUCKY.

DEVICE FOR HANGING HARNESS.

SPECIFICATION forming part of Letters Patent No. 327,585, dated October 6, 1885.

Application filed October 9, 1883. Serial No. 108,548. (No model.)

*To all whom it may concern:*

Be it known that I, THOMAS H. PENDERGAST, a citizen of the United States, residing at Louisville, in the county of Jefferson and State of Kentucky, have invented a certain new and useful Improvement in Devices for Hanging Harness of Horses Used in Fire-Engines; and I do hereby declare that the following is a full, clear, and exact description of the construction and operation of the same, reference being had to the accompanying drawings, forming part of this specification.

This my invention relates to certain new and useful improvements in devices for hanging the harness of fire-engine horses, consisting in a swinging lever hinged to the ceiling of the room, to the end of which a bifurcated lever is suspended by means of a rope, and to the points of this lever the harness is hung in a position ready to be dropped upon the horse at any moment.

The object of this my invention is to provide a means for instantly detaching the harness from a suspending device by means of a line in the hands of the driver, and for then automatically removing the said device to one side, out of the way. I attain the above object by the mechanism illustrated in the drawings, in which—

Figure 1 is a perspective view of the device with the harness and lever shown in perspective. Fig. 2 is an edge view of the front end of the lever upon which the harness is hung, showing the hinged hook with the sleeve and trigger by which it is operated or turned down to drop the harness. Fig. 3 is an edge view of the bar for holding up the swinging lever, showing its form and the manner of securing it to the ceiling. Fig. 4 is a perspective view showing the several devices in their proper places on the ceiling in connection with the bifurcated lever from which the harness is suspended.

Similar letters refer to similar parts throughout the several views.

In the drawings, A A represent the harness and collar, with the hip-straps and traces, which constitute the harness, which may be made in any suitable form, but for which I make no claim, and are only shown to illustrate the application of my invention.

B is the tongue of the carriage, and C C are the double and single trees, which are also only shown to illustrate the application of my invention, which consists, first, in a bifurcated lever, D, from which the harness is suspended, which lever is made of metal and in form as shown in the drawings, extending back in the center between the bifurcated parts E E, entering the cross-bar F, and secured to it by means of a nut, and to the side bars, E', by means of screw-nuts, in order to be easily removed when no bifurcated parts are required.

G is the hook of the lever D, which is hinged under the sleeve H, and I is the trigger for operating the sleeve H, and J is the link which connects them, and K is a line connecting with what would be the horse's bridle-bit in front, if hitched up, and connects with the trigger I in such manner as to operate it, with the end extending back to the driver's seat, so that he may grasp it, and by means of a slight pull on the line the trigger will release the hook G, and thereby cause the harness to drop upon the horses without loss of time, and by means of the weight L, attached to cord N, which connects with the lever D, it is immediately drawn up and turned out of the way by the lever O, which is hinged to the ceiling of the room, as shown in Fig. 4, in such a manner as to swing around easily, and is further provided with an angle-arm, P, at the hinged end, in which two sleeves, R and V, are inserted, over which the cord N passes in the direction of the sleeve S, which is secured to the ceiling in another part of the room, to be out of the way, and as the harness falls and relieves the bar D of its weight the bar O is drawn around by the weight L upon the cord N, which passes over a pulley on the arm P, thereby leaving the way clear.

T is a bar made in form as shown in Fig. 3, and is secured to the ceiling, as shown in Fig. 4, for the purpose of holding up the end of lever O, upon which it rests in supporting the weight of the harness, and answers as a slide for the bar as it turns around.

V is a sheave-block hooked on the end of lever O, over which the cord N passes in leading down to the lever D, and X is the ceiling of the house, and Y Y are the doors.

In order that others skilled in the art may understand its operation, after the harness is properly adjusted on the lever D, which is suspended from the lever O on the ceiling by means of the cord N, which leads over sheaves to the weight L in the back part of the room, and by means of the weight of the harness on lever D, the lever O is drawn forward and the weight L raised up, and when the horse is led under it, by means of a slight pull upon the main driving-line K, which connects with the trigger I by means of a loop near the center, the harness will be detached from the lever D and drop upon the horse, and thereby relieve the lever O of its weight, and by means of the weight L on cord N the lever D is drawn up and turned out of the way by the lever O on the ceiling, to which the weight L is attached. Therefore,

What I claim as my invention, and desire to secure by Letters Patent, in devices for hanging harness of fire-engine horses, is—

1. The bifurcated lever D, provided with the cross-bar F, as described, having hinged hook G, sleeve H, link J, and trigger I, in combination with line K, substantially as described, and for the purpose set forth.

2. In combination with the bifurcated lever D, as described, the bar T, the swinging lever O, having angle-arm P and sheaves R and V, the sheave S, the cord N, and weight L, by which the lever O is operated, substantially as described, and for the purpose set forth.

THOMAS H. PENDERGAST.

Witnesses:
FRANK BARDON,
GEO. D. LEE.